United States Patent [19]

Hattori

[11] Patent Number: 5,455,895
[45] Date of Patent: Oct. 3, 1995

[54] PRINTING APPARATUS WITH AUTOMATIC OPERATION MODE CHANGING FUNCTION

[75] Inventor: Hiroshi Hattori, Inazawa, Japan

[73] Assignee: Brother Kogyo Kabushiki Kaisha, Nagoya, Japan

[21] Appl. No.: 63,323

[22] Filed: May 19, 1993

[30] Foreign Application Priority Data

Aug. 18, 1992 [JP] Japan .................................. 4-219294

[51] Int. Cl.$^6$ ........................................ G06K 15/00
[52] U.S. Cl. .................................... 395/112; 395/115
[58] Field of Search ................................ 395/112, 114, 395/115, 116, 164, 165, 166, 113, 400, 425; 400/76, 61, 62, 70, 71, 77; 358/404, 444; 346/154

[56] References Cited

U.S. PATENT DOCUMENTS

| | | | |
|---|---|---|---|
| 4,610,940 | 9/1986 | Araihara | 355/53 |
| 4,641,147 | 2/1987 | Sakura et al. | 346/76 |
| 4,968,159 | 11/1990 | Sasaki et al. | 400/76 |

*Primary Examiner*—Mark R. Powell
*Assistant Examiner*—Dov Popovici
*Attorney, Agent, or Firm*—Oliff & Berridge

[57] ABSTRACT

In a printing apparatus, after the initial process program, printing data input from a host computer is stored in the receiving buffer of the control system of the printing apparatus. Then, a determination process program detects control codes from the printing data stored in the receiving buffer. One operation mode for printing is determined based on the detected control code. As a result of the determination process program, if a plurality of operation modes are determined or if no operation mode is determined, the determination process program uses operation mode historical information stored in an operation mode historical information buffer to determine one operation mode candidate. Therefore, the degree of certainty is high in automatically determining an operation mode which best corresponds to the printing data, and the chance of a misjudgment of an operation mode is extremely decreased.

20 Claims, 4 Drawing Sheets

PRINTING APPARATUS WITH AUTOMATIC OPERATION MODE CHANGING FUNCTION

BACKGROUND OF THE INVENTION

1. Field of the Invention

The present invention relates to a control device of a printing apparatus which can automatically change between a plurality of operation modes having their respective control code systems different from each other.

2. Description of Related Art

Various kinds of printing apparatuses are in use in which, letters, figures and the like based on printing data input from an external device are printed in accordance with control codes, such as bold face, subscript, line feed, form feed and the like, contained in the printing data.

In addition, in order to enable more varied printing, known printing apparatuses often have their own particular operation modes such as a high-speed mode for carrying out printing at high speed, a switching mode for switching between lateral writing and vertical writing, a mode for designation of dot space and bit image and the like. These modes are also designated by the control codes, in particular, escape control codes (ESC sequence code) in the printing data. A sequence of printing data input from the host computer has control codes in accordance with an operation mode.

A printing apparatus having a plurality of operation modes and capable of changing the operation modes in accordance with the printing data input from the host computer carries out the following printing operation. First, the input printing data is stored temporarily, and control codes which are particular to each operation mode are detected from the printing data. Then, an operation mode which corresponds to the printing data to carry out a printing operation is determined based on the detected control codes. The determined operation mode is set automatically to carry out the desired printing operation.

However, in the above-mentioned printing apparatus, if no control code exists in the input printing data, an operation mode which corresponds to the printing data to carry out a printing operation cannot be determined at all. Moreover, if each of the detected control codes corresponds to a plurality of operation modes, the degree of certainty to determine one operation mode which best corresponds to the printing data to carry out the printing operation becomes extremely low.

In the above-mentioned cases, there is a high possibility to misjudge an operation mode to carry out a printing operation. As a result, a precise printing result cannot be obtained.

SUMMARY OF THE INVENTION

An object of the present invention is to provide a control device of a printing apparatus with an automatic operation mode changing function capable of automatically determining one operation mode with a high degree of certainty and decreasing the chances of a misjudgment of an operation mode.

To achieve the above and other objects, the control device of a printing apparatus according to the present invention comprises: operation mode storing means for storing a plurality of operation modes; printing data storing means for storing printing data input from a host computer; operation mode determining means for determining in which one of the plurality of operation modes stored in said operation mode storing means the printing data is to be printed; and operation mode history storing means for storing historical information which is related to the operation mode determined by said operation mode determining means, wherein said operation determining means determines in which one of the plurality of operation modes the printing data is to be printed data based on the historical information stored in said operation mode history storing means.

In operation, the control device of a printing apparatus of the present invention prints printing data input from a host computer. The printing data is stored in the printing data storing means, and the operation mode determining means determines in which one of the plurality of operation modes stored in the operation mode storing means the printing data is to be printed. The operation mode history storing means stores historical information which is related to the operation mode determined by the operation mode determining means, and the operation mode determining means determines in which one of the plurality of operation modes the printing data is to be printed based on the historical information stored in the operation mode history storing means.

As is clear from the above explanation, in the printing apparatus of the present invention, when the degree of certainty for the determination of the operation mode is extremely low or no operation mode can be determined based on the control codes which exist in the printing data to be printed, the printing data is printed based on the operation mode determination results including historical information of the operation modes which have been selected before. Therefore, the certainty becomes higher in determining an operation mode which best corresponds to the printing data.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

A preferred embodiment which illustrates the present invention is explained by referring to the accompanying drawings.

Figure 1:
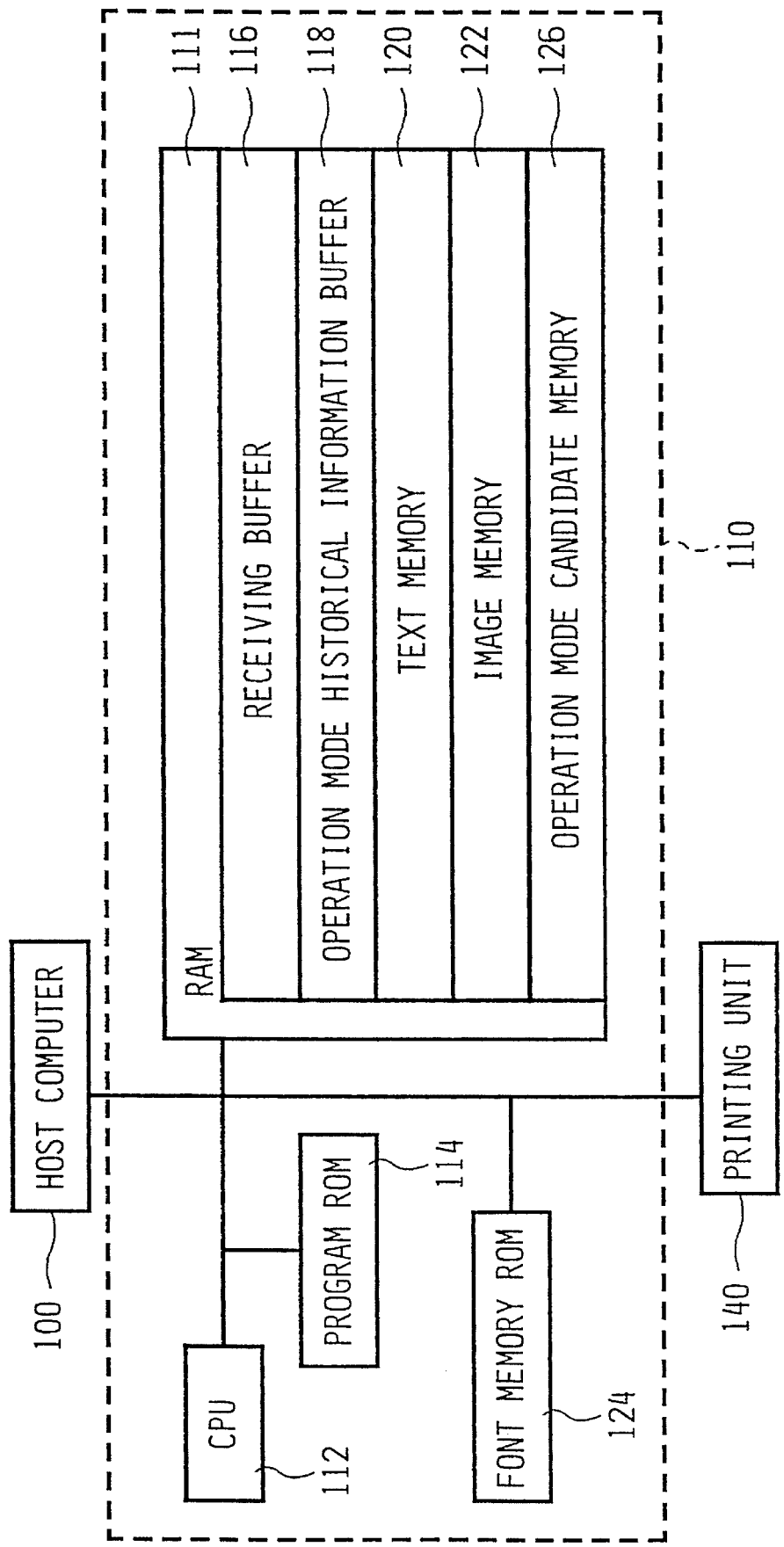
FIG. 1 is a schematic outline structure of the printing apparatus of the preferred embodiment.

First, the structure of a printing apparatus is explained by referring to FIG. 1. A control device 110 of the printing apparatus is connected to a host computer 100 and a printing unit 140. The control device 110 comprises CPU 112 for controlling the printing apparatus, program ROM 114 for storing various programs and operation modes, font memory ROM 124 for storing various fonts and RAM 111.

RAM 111 comprises a receiving buffer 116 for temporarily storing printing data input from the host computer 100, an operation mode historical information buffer 118 for storing information of operation modes determined to print printing data input from the host computer 100, a text memory 120, an image memory 122, and an operation mode candidate memory 126 for storing operation mode candidates during the operation mode determination process program.

Printing data input from the host computer 100 is stored temporarily in the receiving buffer 116 based on the program ROM 114. Printing information is developed in the text memory 120 based on the printing data, and the printing unit 140 is controlled with reference to the image memory 122 and the font memory 124 to print the printing information. Information of an operation mode which is finally determined to carry out the printing operation is stored in the operation mode historical information buffer 118. If the amount of information of operation modes exceeds the maximum amount of the operation mode historical information buffer 118, the oldest information of operation modes is deleted.

Figure 2:
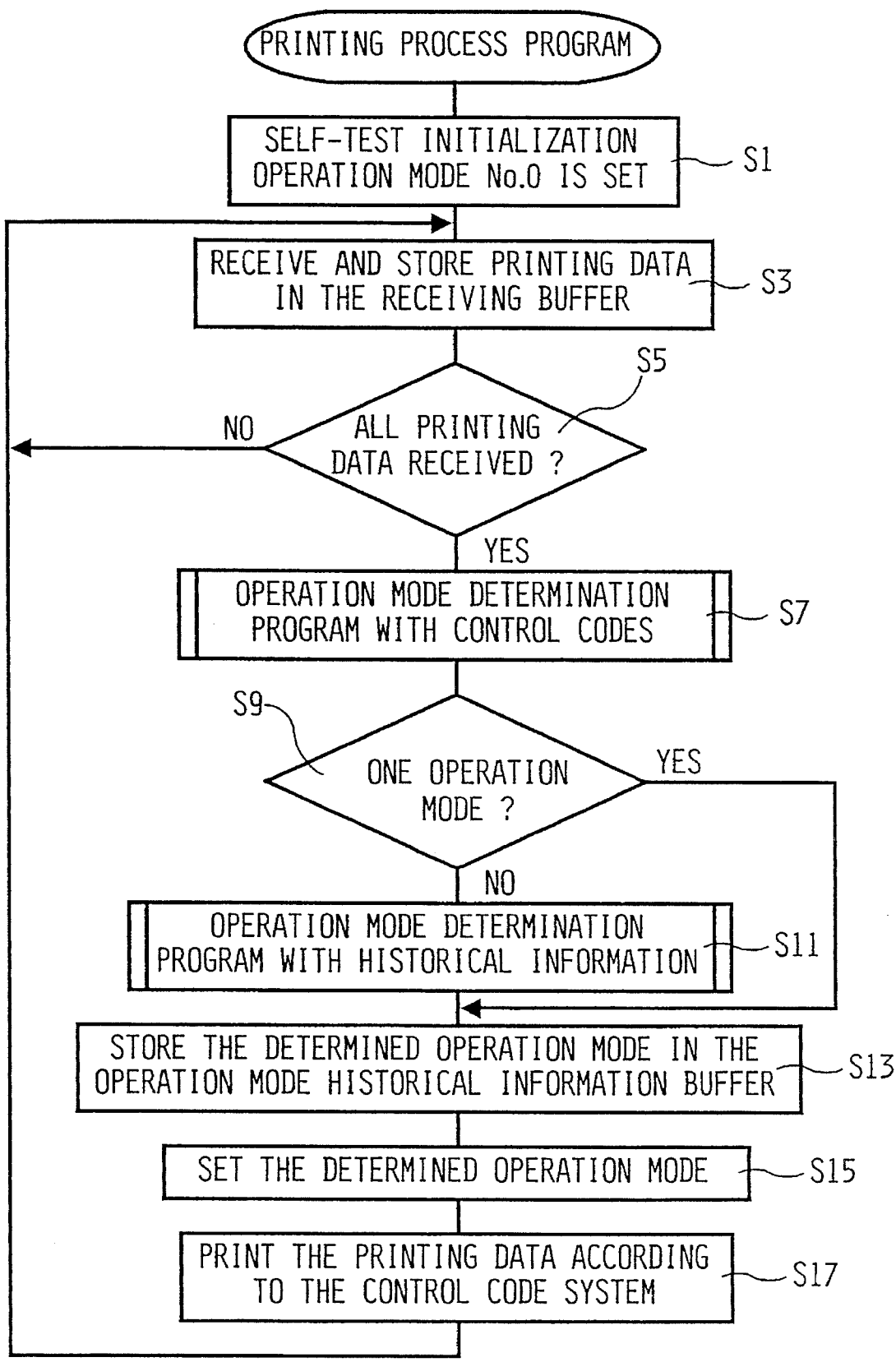
FIG. 2 is a flow chart of the printing process program of the printing apparatus of FIG. 1.

The printing process program with control codes stored in the program ROM 114 is explained by referring to FIG. 2.

The printing process program is initiated by CPU 112 at the start-up when a power source of the printing apparatus is turned on. When the program is started, a SELF-TEST is performed and each memory is initialized for the initialization of the printing apparatus. During initialization, an operation mode No. 0 is provisionally selected from among three operation modes No. 0, No. 1 and No. 2 (S1).

Then, printing data input from the host computer 100 is received, for example for one page, and the received printing data is stored in a printing data buffer which is assigned at a predetermined address of the receiving buffer 116 (S3). Next, the CPU 112 determines if all of a sequence of printing data, that is, printing data of one page is already received or not (S5). If the printing data is completely received (S5:YES), the program proceeds to the operation mode determination process program with control codes (S7).

Figure 3:
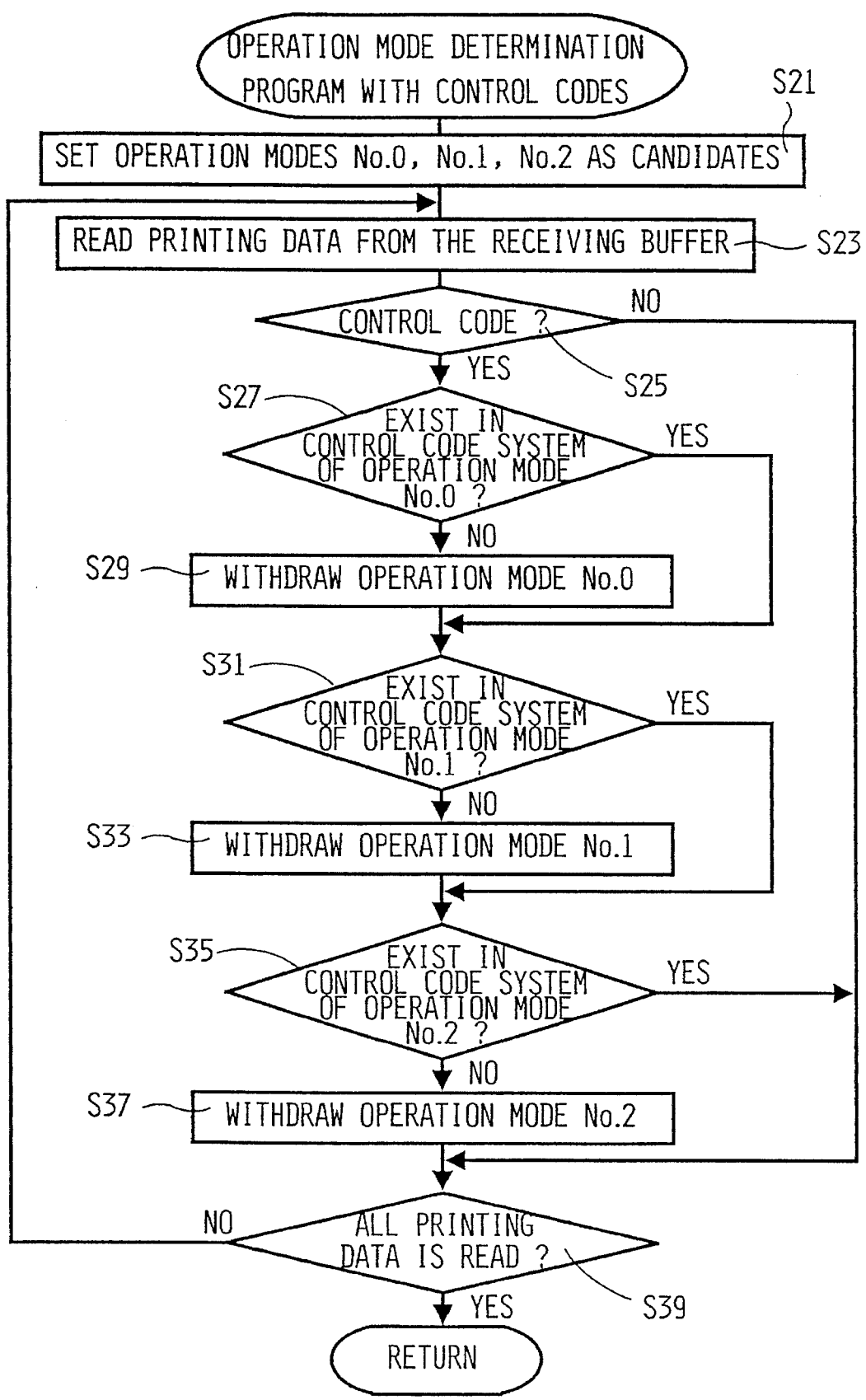
FIG. 3 is a flow chart of the operation mode determination program with control codes of the printing apparatus of FIG. 1.

The operation mode determination process program executed by the CPU 112 is explained by referring to FIG. 3. When the program starts, all of the operation modes, No. 0, No. 1 and No. 2, become candidates for the operation mode. All of the operation modes are stored in the operation mode candidate memory 126 (S21). Next, the printing data is read from the receiving buffer 116 (S23), and a determination is made whether the read printing data is a control code or not (S25).

If the read printing data is determined to be a control code (S25:YES), the program proceeds to the following determining process (S27–S37). On the other hand, the determination is that the printing data is not a control code (S25:NO), the program proceeds to S39.

If the determination at S25 is that the read printing data is a control code, a determination is made whether the detected control code exists in a control code system of the operation mode No. 0 or not (S27). If the determination at S27 is that the detected control code does not exist in the control code system of the operation mode No. 0 (S27:NO), the operation mode No. 0 is withdrawn from the stored candidates. The information of the operation mode No. 0 is deleted from the operation mode candidate memory 126 (S29). On the other hand, if the determination at S27 is that the control code exists in the control code system of the operation mode No. 0 (S27:YES), the program proceeds to S31.

Next, the CPU 112 determines whether the control code detected at S25 exists in a control code system of the operation mode No. 1 or not (S31). If the control code does not exist in the control code system of the operation mode No. 1, the operation mode No. 1 is withdrawn from the candidates of the operation mode (S31:NO). The information of the operation mode No. 1 is deleted from the operation mode candidate memory 126 (S33). On the other hand, if it is determined that the control code exists in the control code system of the operation mode No. 1 (S31:YES), the program proceeds to S35.

In the same way, the CPU 112 determines whether the control code detected at S25 exists in a control code system of the operation mode No. 2 or not. If it is determined that the control code does not exist in the control code system of the operation mode No. 2 (S35:NO), the operation mode No. 2 is withdrawn from the candidates of operation modes. The information of the operation mode No. 2 is deleted from the operation mode candidate memory 126 (S37). On the other hand, if it is determined that the control code exists in the control code system of the operation mode No. 2 (S37:YES), the program proceeds to S39.

Next, at S39, the CPU 112 determines whether all the printing data stored in the receiving buffer 116 has been read or not. If all the printing data stored in the receiving buffer 116 has not been read (S39:NO), the program returns to S23, and the operation mode determining process is executed in the same way based on the next printing data. On the other hand, if all the printing data stored in the receiving buffer 116 is already read (S39:YES), the operation mode determining process with control codes is finished, and the program returns to the program shown in FIG. 2.

After the operation mode determination process program shown in FIG. 3, if one operation mode is determined (S9:YES), the program proceeds to S13. However, if more than one operation mode is determined or if no operation mode is determined (S9:NO), the operation mode determination process program with operation mode historical information (S11) is executed to determine one candidate for the operation mode.

Figure 4:
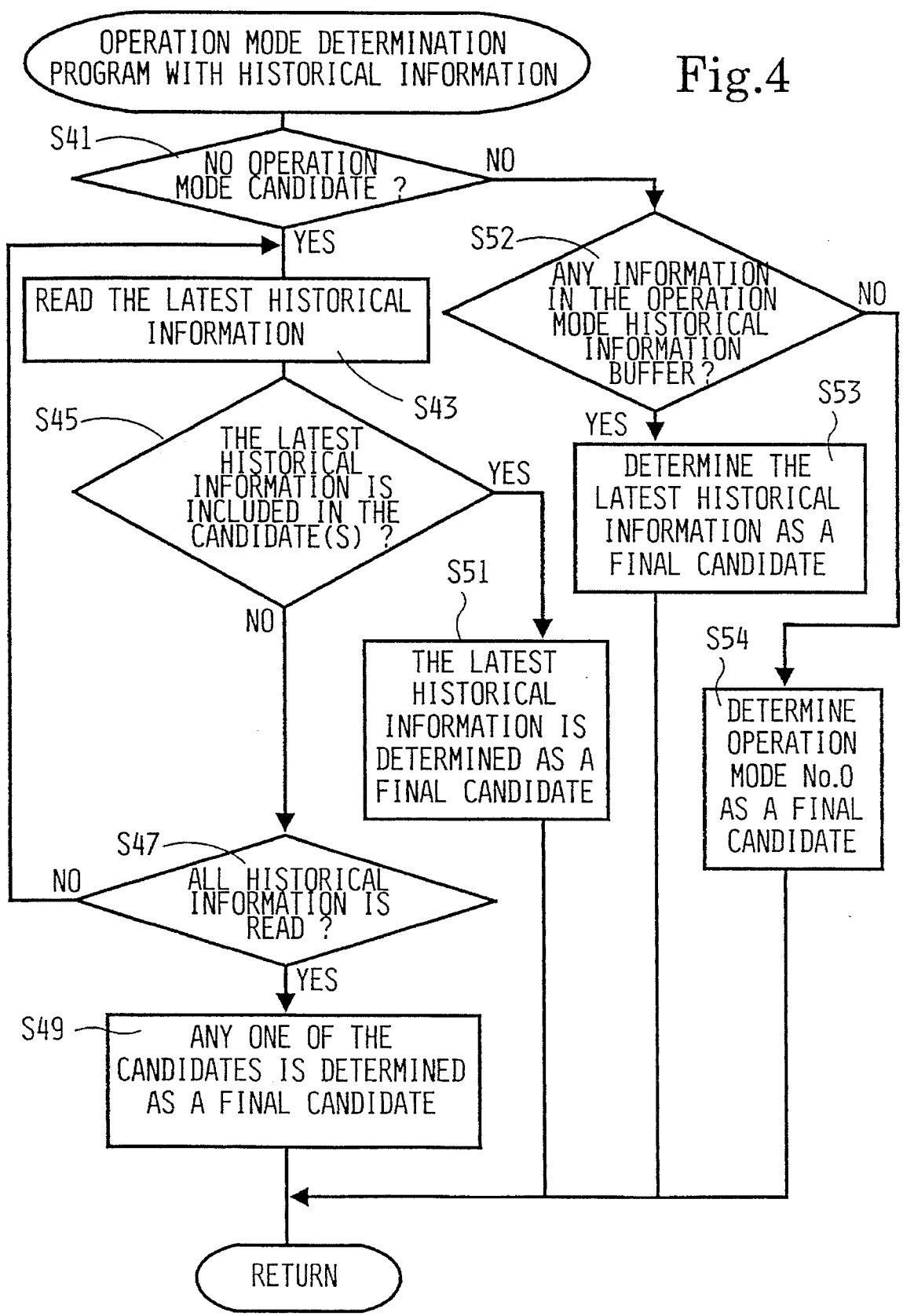
FIG. 4 is a flow chart of the operation mode determination program with historical information of the printing apparatus of FIG. 1.

The determination process program of S11 is explained by referring to FIG. 4. If the determination process program with operation mode historical information is started, the CPU 112 determines if there is any operation mode candidate determined at S11 or not (S41).

If it is determined that there is no operation candidate (S41:NO), it is determined if there is any information of operation modes in the operation mode historical information buffer 118 or not (S52). When it is determined that there is no information of an operation mode in the operation mode historical information buffer 118 (S52:NO), the operation mode No. 0 is determined as a final candidate (S54). Then, the program returns to the program shown in FIG. 2. On the other hand, when it is determined that there is information of an operation mode in the operation mode historical information buffer 118 (S52:YES), the latest historical information of an operation mode stored in the operation mode information buffer 118 is read (S53). Then, the operation mode corresponding to the latest historical information is determined as a final candidate and the program returns to the program shown in FIG. 2.

On the other hand, if it is determined that there is at least one operation mode candidate (S41:YES), the latest historical information is read from the operation mode historical information buffer 118 (S43). Then, it is determined whether the operation mode candidate or candidates include(s) the operation mode corresponding to the read latest historical information or not (S45).

If the operation mode candidate(s) include(s) the operation mode corresponding to the latest historical information (S45:YES), the operation mode of the latest historical information is determined as a final candidate (S51), and the program returns to the program shown in FIG. 2.

If the operation mode candidate(s) do(es) not include the operation mode of the latest historical information (S45:NO), it is determined if all the historical information in the operation mode past information buffer 118 is read or not (S47). If all the historical information is not read from the operation mode historical information buffer 118 (S47:NO), the program returns to S43. Then, the next historical information is read, and it is determined if the operation mode candidate(s) include(s) the operation mode of the next historical past information (S45).

If any historical information read from the operation mode historical information buffer 118 at S43 is not included in the operation mode candidate(s) (S47:YES), any one of the candidates is determined as a final candidate (S49), and the program returns to the program shown in FIG. 2.

The information of the operation mode of the final candidate is stored in the operation mode historical information buffer 118 (S13), and the operation mode which is finally determined is set (S15). Then, the printing data stored in the receiving buffer 116 is printed according to the control code system of the set operation mode (S17). If the printing operation of the printing data stored in the receiving buffer 116 is finished, the program returns to S3 to receive the next printing data.

In the printing apparatus which can change an operation mode between three operation modes No. 0, No. 1 and No. 2, an operation mode is rarely changed between pages. In many cases, a printing operation is carried out in the same operation mode as used before. That is, a plurality of pages of printing data input to the printing apparatus is generally supposed to be printed in the same operation mode. In the above-mentioned printing apparatus which carries out a printing operation for each page, even if an operation mode cannot be determined in the middle of the plurality of pages, an operation mode which best corresponds to the printing data can be determined based on the operation modes which have been set before.

Therefore, even if an operation mode which best corresponds to the printing data cannot be determined, a misjudgment of the operation mode to carry out printing data can be prevented. The degree of certainty to determine an operation mode which best corresponds to the printing data becomes quite high by determining a final operation mode candidate based on the operation modes which have been determined before.

It is to be understood that the present invention is not restricted to the particular forms shown in the foregoing embodiment. Various modifications and alternatives can be made thereto without departing from the scope of the invention encompassed by the appended claims.

What is claimed is:

1. A control device for determining a printing operation mode for a printing apparatus comprising:

memory means for storing data including operation modes, comprising a printing data memory means for storing printing data including control codes corresponding to operation modes for printing, an operation mode candidate memory means for storing operation mode candidates, and an historical operation mode memory means for storing previously selected operation modes;

candidate selecting means for selecting an operation mode candidate from the operation modes stored in said operation mode candidate memory means;

detecting means for detecting a control code in the printing data stored in said printing data memory means;

initial operation mode determining means for determining an operation mode based on the control code detected in the printing data by determining whether the detected control code corresponds to the selected operation mode candidate, withdrawing the operation mode candidate from said operation mode candidate memory means when the detected control code does not correspond to the selected operation mode candidate, and directing said candidate selecting means to reselect another operation mode candidate from said operation mode candidate memory means until all of the operation modes have been selected as candidates, wherein when the detected control code corresponds to the selected operation mode candidate, that operation mode is left in the operation mode candidate memory means and when only one operation mode remains in said operation mode candidate memory means, the one remaining operation mode is stored in said historical operation mode memory means and is set as the printing operation mode; and historical operation mode determining means for determining the printing operation mode when said initial operation mode determining means determines a number of operation modes other than one, including a plurality of operation modes and no operation mode remaining in said operation mode candidate memory means, wherein said historical operation mode determining means includes automatic selecting means for automatically selecting one operation mode from the operation modes stored in said historical operation mode memory means and said operation mode candidate memory means, wherein the automatically selected operation mode is stored in said historical operation mode memory means and is set as the printing operation mode.

2. The control device of claim 1, wherein said automatic selecting means includes searching means for searching said historical operation mode memory means for operation modes and, when said historical operation mode memory means includes no operation modes, said automatic selecting means automatically selects one of the operation modes from said operation mode candidate memory means and when no operation mode has been determined by the initial operation mode determining means said automatic selecting means automatically selects the operation mode from the memory means.

3. The control device of claim 1, wherein said automatic selecting means includes searching means for searching said historical operation mode memory means for operation modes and wherein said automatic selecting means automatically selects a most recently stored operation mode as the printing operation mode when no operation mode has been determined by said initial operation mode determining means.

4. The control device of claim 3, wherein said automatic selecting means further includes correspondence means for comparing the operation mode candidates determined by said initial operation mode determining means to operation modes stored in said historical operation mode memory means and selecting a most recently stored operation mode that corresponds to an operation mode candidate determined by said initial operation mode as the printing operation mode and wherein when no operation mode candidate determined by the initial operation mode determining means corresponds to an operation mode from said historical operation mode memory means, said automatic selecting means arbitrarily selects one of the operation modes determined by said initial operation mode determining means.

5. The control device of claim 1, further comprising initialization means for initializing said memory means.

6. The control device of claim 1, further comprising printing data comparing means for determining whether all the printing data has been received in said printing data memory means from a host computer.

7. The control device of claim 1, further comprising operation mode comparing means for determining whether all operation modes stored in said historical operation mode memory means have been read by said historical operation mode determining means.

8. The control device of claim 1, further comprising automatic deleting means for automatically deleting an oldest operation mode stored in said historical operation mode memory means when said historical operation mode memory means is full.

9. A control device of a printing apparatus comprising:
a memory storing data including operation modes, comprising a printing data memory storing printing data including control codes corresponding to operation modes for printing, an operation mode candidate memory storing operation mode candidates, and an historical operation mode memory storing previously selected operation modes;
a candidate operation mode selector selecting an operation mode candidate from the operation modes stored in said operation mode candidate memory;
a detector detecting a control code in the printing data stored in said printing data memory;
initial operation mode determiner determining means an operation mode for printing based on the control code detected in the printing data by determining whether the detected control code corresponds to the selected operation mode candidate, withdrawing the operation mode candidate when the detected control code does not correspond to the selected operation mode candidate, and directing said candidate operation mode selector to reselect another operation mode candidate from said operation mode candidate memory until all of the operation modes have been selected as candidates, wherein when the detected control code corresponds to the selected operation mode candidate, that operation mode is left in the operation mode candidate memory and when only one operation mode remains in said operation mode candidate memory, the one remaining operation mode is stored in said historical operation mode memory means and is set as the printing operation mode; and
an historical operation mode determiner determining an operation mode for printing when said initial operation mode determiner determines a number of operation modes other than one remaining in said operation mode candidate memory, wherein said historical operation mode determiner includes an automatic selector that automatically selects the final operation mode from one of said historical operation mode memory and said operation mode candidate memory, wherein the automatically selected operation mode is stored in said historical operation mode memory and is set as the printing operation mode.

10. The control device of claim 9, wherein said automatic selector includes a searcher searching said historical operation mode memory for operation modes and, when said historical operation mode memory includes no operation modes, said automatic selector automatically selects one of the operation modes from said operation mode candidate memory and when no operation mode has been determined by said initial operation mode determiner, said automatic selector automatically selects one of the operation modes from the memory.

11. The control device of claim 9, wherein said automatic selector includes a searcher searching said historical operation mode memory for operation modes and, wherein said automatic selector automatically selects a most recently stored operation mode as the printing operation mode when no operation mode has been determined by said initial operation mode determiner.

12. The control device of claim 11, wherein said automatic selector further includes a correspondence device comparing the operation modes determined by said initial operation mode determiner to operation modes stored in said historical operation mode memory and selecting a most recently stored operation mode that corresponds to an operation mode determined by said initial operation mode determiner as the printing operation mode and wherein when no operation mode candidate determined by the initial operation mode determiner corresponds to an operation mode from said historical operation mode from said historical operation mode memory, said automatic selector arbitrarily selects one of the operation modes determined by said initial operation mode determiner.

13. The control device of claim 9, further comprising an initializer initializing said memory.

14. The control device of claim 9, further comprising a printing data comparer determining whether all the printing data has been received in said printing data memory from a host computer.

15. The control device of claim 9, further comprising an operation mode comparer determining whether all operation modes stored in said historical operation mode memory have been read by said historical operation mode determiner.

16. The control device of claim 9, further comprising an automatic deleter that automatically deletes an oldest operation mode stored in said historical operation mode memory when said historical operation mode memory is full.

17. A method of controlling printing comprising the steps of:
storing data, including printing data having control codes corresponding to operation modes for printing, operation mode candidates, and previously selected operation modes;
selecting an operation mode candidate from the stored operation mode candidates;
detecting a control code in the stored printing data;
determining an operation mode from the control code detected in the printing data by determining whether the detected control code corresponds to the selected operation mode candidate, withdrawing the operation mode candidate when the detected control code does not correspond to the selected operation mode candidate, and reselecting another operation mode candidate, wherein when all the operation mode candidates have been selected and only one operation mode candidate remains, further including the step of storing that operation mode candidate and setting that stored operation mode for printing; and
determining a printing operation mode when a number of operation modes are determined other than one, including automatically selecting the printing operation mode from one of the previously selected operation modes and the operation mode candidates, storing the automatically selected operation mode and setting the determined operation mode for printing.

18. The method of claim 17, wherein the step of automatically selecting includes searching previously selected operation modes and, when no previously selected operation modes are found, selecting one of the determined operation mode candidates.

19. The method of claim 18, wherein the step of automatically selecting further includes matching one of the determined operation mode candidates to previously selected operation modes and selecting a most recently previously selected matching operation mode as the printing operation mode.

20. The method of claim 18, wherein the step of automatically selecting includes searching previously selected operation modes and, when no operation mode candidate has been determined and when previously selected operation modes are located, selecting a most recently previously selected operation mode as the printing operation mode.

* * * * *